United States Patent [19]
Edwards

[11] 3,750,625
[45] Aug. 7, 1973

[54] INSECT REARING TRAY

[75] Inventor: Bryant Edwards, Clarendon Hills, Ill.

[73] Assignee: Illinois Tool Works Inc., Chicago, Ill.

[22] Filed: Aug. 10, 1972

[21] Appl. No.: 279,407

[52] U.S. Cl. .......................... 119/1, 119/15, 119/17
[51] Int. Cl. .............................................. A01k 29/00
[58] Field of Search ........................... 119/1, 15, 17; 229/2.5; 206/56 A

[56] References Cited
UNITED STATES PATENTS

| | | | |
|---|---|---|---|
| 1,974,549 | 9/1934 | Spencer et al. ........................... | 119/1 |
| 2,813,799 | 11/1957 | Bender et al. ............... | 206/56 A UX |
| 3,234,030 | 2/1966 | Knirim .............................. | 229/2.5 X |
| 3,653,357 | 4/1972 | Sheidlower et al. ..................... | 119/1 |
| 3,687,110 | 8/1972 | Braunhut ............................... | 119/1 |

Primary Examiner—Hugh R. Chamblee
Attorney—R. W. Beart and E. L. Benno

[57] ABSTRACT

A tray for use in mass rearing of insects, particularly beetles such as boll weevils, in an artificial environment from incubation, through hatching and growth; and including a compartmented tray with multiple cup-like compartments arranged in multiple rows with shallow egg receiving recesses between the compartment of pairs of rows and communicating with upper edge portions of the compartments through shallow crawl passages; and with the rows of compartments in communication with shallow air access passages at the upper edge portions thereof peripherally removed from the crawl passages; and the entire compartmented tray being covered by an imperforate sheet of plastic material forming the upper closing walls of the several recesses, passages and compartments.

10 Claims, 3 Drawing Figures

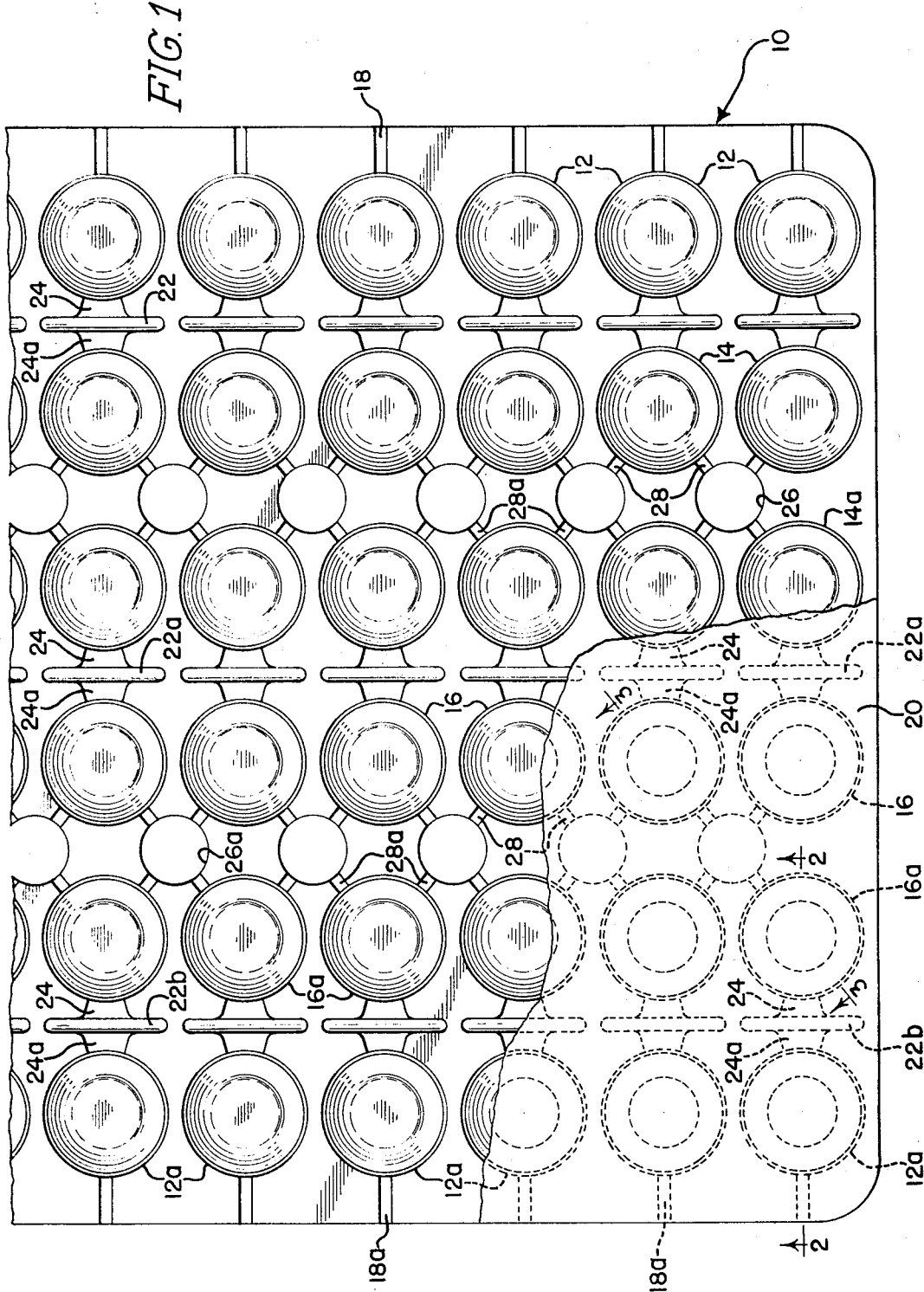

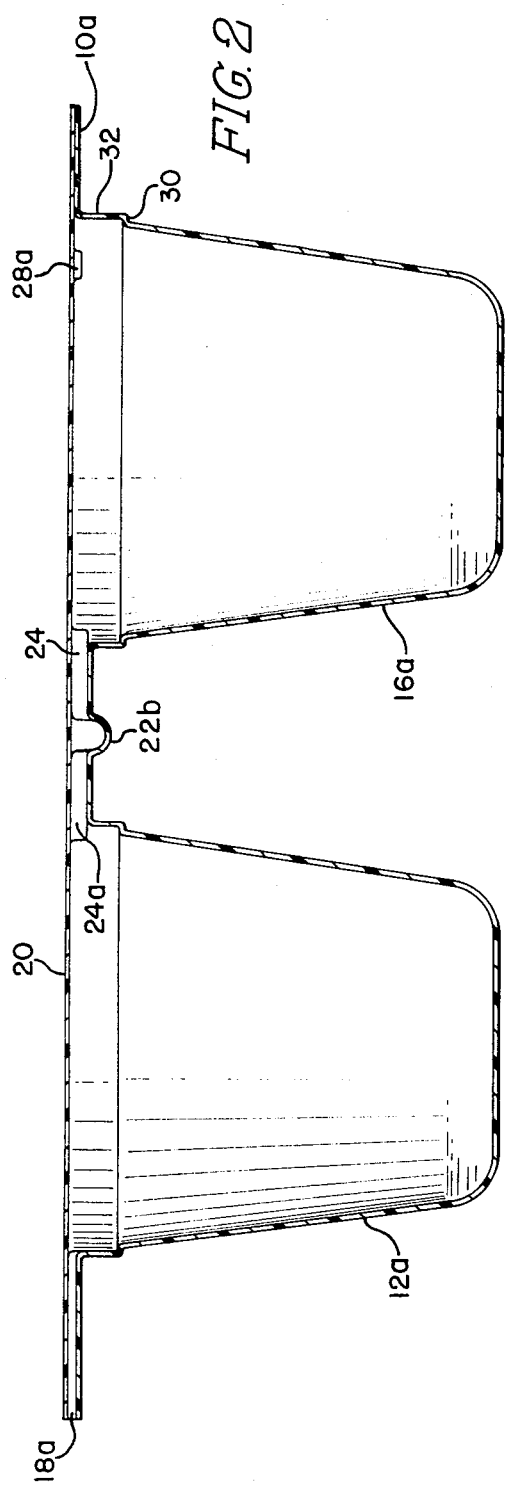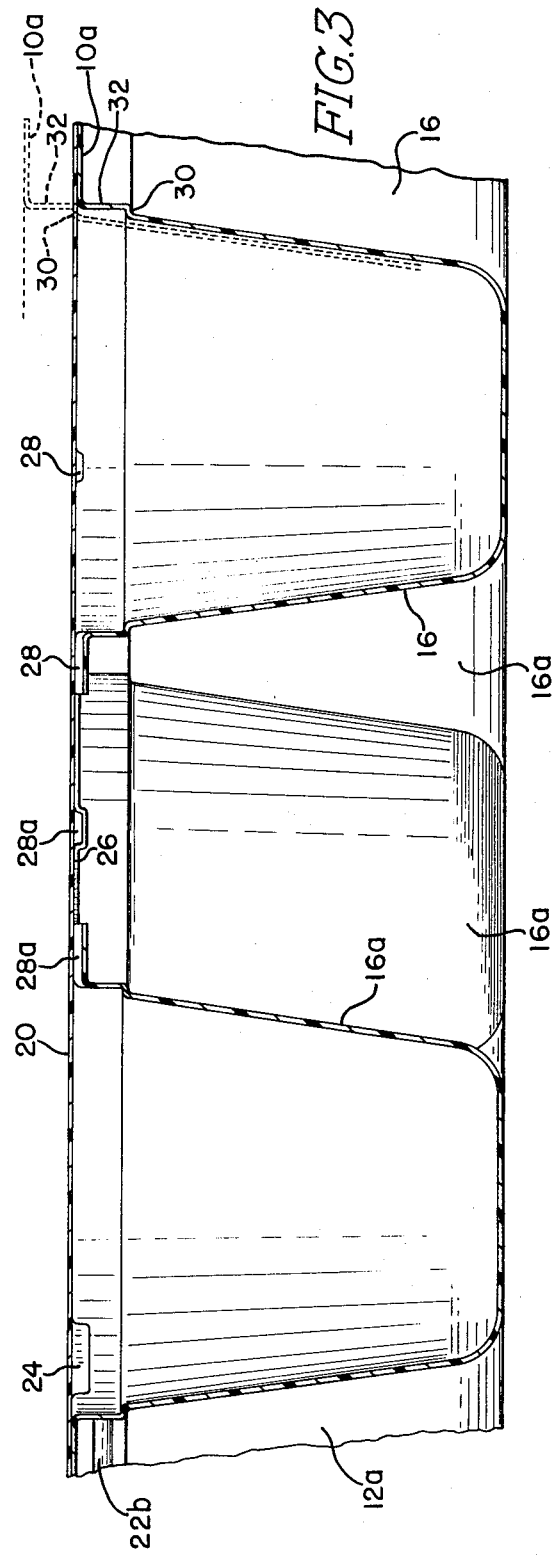

INSECT REARING TRAY

SUMMARY

Extensive efforts have been made over a long period of years to control or reduce the extensive yearly damage caused by the boll weevil in cotton fields. The U.S. Department of Agriculture has many publications dealing with such control and offering recommendations in farming practices that aid in weevil control and in control by using dusts of various types. More recently, an experimental program has been initiated to create an artifical controlled environment in which there is incubation and hatching of the weevil eggs, growth through the larvae or grub stage from which the worms will transfer to a nutrient compartment and change to the pupae stage and growth into an adult weevil. The program then contemplates sterilization of the weevils, as by radiation, and release into a cotton field for mating but without reproduction and hence a decimation of weevils. Covered compartmented trays have been used with recesses for receiving the eggs between compartments and with passages from the recesses to the compartments in which nutrient material is available to enhance the transformation from worm to adult weevil. Of course, air access to the passages, recesses and compartments must be provided. Where such access is provided by perforation of a cover sheet, it has been found that the tiny claw-like frontal appendages of the weevil could work on roughened portions thereof to such an extent as to permit escape from the environment before the radiation step for sterilization.

The present invention is concerned with the provision of such an insect rearing tray with an object of providing adequate air access while preventing escape from the tray at any stage of insect development.

Another object of the invention is to provide such an insect rearing tray with the compartmented tray closed by an imperforate sheet of plastic material with the air access or breathing openings provided in the tray between rows of cup-like compartments.

A further object of the invention is to provide a tray assembly substantially of the above type wherein the egg recesses and crawl passages are formed in the tray between rows of cup-like compartments to opposite sides of the air access passages.

The invention further aims to provide the tray as a thermoformed unit so that the passages and compartments present no sharp or roughened edges on which gnawing may be initiated.

The above and other objects of the invention will in part be obvious and will be hereinafter more fully pointed out in connection with the detail description of the drawings in which:

FIG. 1 is a fragmentary plan view of the tray showing the compartments and communicant passages, with the lower right hand portion of the tray covered with the imperforate plastic sheet which may be transparent or translucent;

DETAILED DESCRIPTION

FIG. 2 is an enlarged fragmentary sectional view taken along the line 2—2 of FIG. 1 to show the recesses and passages communicating with the compartments of a pair of rows, and FIG. 3 is a similarly enlarged fragmentary section taken along the line 3—3 of FIG. 1 showing the air openings and passages between a pair of rows of compartments.

With reference to the accompanying drawings, and particularly FIG. 1 at this time, the tray 10 is thermoformed from suitable plastic material to provide multiple pairs of rows of cup-like compartments with longitudinal edge rows of cups 12, 12a and intermediate rows of cups 14, 14a, and 16, 16a. The number of rows of cups and the number of cups in each row may vary in accordance with the equipment for any particular installation. As illustrated, there are shown six rows of cups and each row may include any number of cups as for example, fifteen. The longitudinal edges of the tray are provided with shallow depressions 18, 18a forming air passages to the upper edge portions of the longitudinal edge rows of cups 12, 12a, respectively, and these passages will be covered when the plastic cover sheet 20 is applied to the tray and sealed thereto.

Between each cup in the rows of cups 12 and 14; 14 and 14a; 14a and 16, and 16a and 12a, there are provided longitudinally extending series of recesses 22, 22a, 22b, respectively, formed in the tray surface between pairs of cups. Each of these recesses is in communication with lateral passages 24, 24a also formed in the tray surface. For the series of recesses 22, the passages 24 communicate with the upper edge portions of the cups 12 and the passages 24a communicate with the upper edge portions of the cups 14. In like manner, the passages 24, 24a of the recesses 22a communicate with the cups 14a, 16, respectively; and the passages 24, 24a of the recesses 22b communicate with the cups 16a, 12a, respectively. Between the rows of cups 14, 14a and between the rows of cups 16, 16a, respectively, there are provided openings 26, 26a in the tray surface. Each of these openings is arranged between groups of four cups with a pair of passages 28 radiating therefrom to communicate with pairs of cups 14 and 16 and with other pairs of passages 28a radiating therefrom to communicate with pairs of cups 14a and 16a.

Reference will now be made to the enlarged sectional views of FIGS. 2 and 3 where the upper planar tray surface is indicated by the numeral 10a and this is the surface which is formed to provide the various passages, recesses and openings referred to in connection with FIG. 1. The cup-like compartments are tapered inwardly to bottom closing walls from peripheral stacking shoulders 30 joined to the tray surface 10a by reverse taper stacking rings 32. Thus, as diagrammatically illustrated by dotted lines at the right top end of FIG. 3, multiple trays without the covers can be stacked with limited contact between the shoulders 30 and an adjacent tray, such stacking means permitting ready separation of individual trays for passage through automatic filling machinery and subsequent closing by heat sealing or otherwise securing cover sheets 20 to individual processed trays. With reference to FIG. 2, it will be seen that the recesses such as 22b, though shallow, are relatively deeper than the communicating passages such as 24, 24a. The ends of the recesses are closed and the cover sheet closes off the upper edges of the recesses and passages. Also, the edgewise air passages, as 18a, are likewise shallow and of less depth than the passages 24, 24a. As shown in FIG. 3, the air passages 28, 28a are shallow like the passages 18, 18a and open to the prevailing atmosphere through the openings 26 or 26a in the tray surface 10a.

In contemplated use of the trays, individual trays will be removed from a stack and fed through automatic machinery which will deposite nutrient material in each of the cups and will deposit boll weevil eggs in each of the egg receiving recesses 22, 22a, 22b and then heat seal a cover sheet 20 to each tray as a top for the passages, recesses and cups. The covered trays will then be stacked or otherwise stored for an incubation period during which the eggs will hatch into larvae or grubs in the egg recesses and then find their way through the crawl passages 24, 24a and drop into the nutrient cups. The grubs feed for seven to fourteen days and change into pupae and then into a single healthy boll weevil in each of the nutrient cups. During the entire cycle, there is adequate air breathing through the air access passages 28, 28a which are about half the depth of the crawl passages 24, 24a so as to prevent escape therethrough at any stage of development. Even though the edges of the air access passages at the openings 26, 26a may not be smooth, there is no access of the insect to those edges. The accessible openings of the crawl passages and air breathing passages to the upper edge portions of the cups present smooth thermoformed openings without any rough edges for gnawing. Thus, there is no escape route during this period after which the trays are subjected to a level of radiation to sterilize the hatched boll weevils prior to release.

What is claimed is:

1. A tray for use in insect rearing, and comprising a top surface portion having multiple rows of spaced dependent cup-like compartments with pairs of compartments in communication with one another through passage means in the tray surface portion opening through upper edge portions of respective compartments, said tray surface portion having apertures between pairs of adjacent rows of compartments, and shallow air access passages in the tray surface portion radiating from said apertures and opening into adjacent compartments through the upper edge portions thereof.

2. A tray as claimed in claim 1, wherein each compartment body wall tapers inwardly to the bottom from outward peripheral stacking shoulder means adjacent the upper edge thereof and joined to the upper edge by a relatively short wall portion of slightly reverse taper to that of the body wall permitting stacking of trays one upon another with ready removal of single trays from a stack, and with the passage means and air access passages opening through the upper edge portion of said relatively short wall portion.

3. A tray as claimed in claim 2, wherein passage means includes a pair of shallow crawl passages opening through the upper edge of said relatively short wall portion of a pair of adjacent compartments and communicating with a slightly deeper recess between adjacent compartments.

4. A tray as claimed in claim 3, wherein the air access passages are shallower than said crawl passages.

5. A tray as claimed in claim 1, wherein there is provided an imperforate cover sealed to the tray surface portion closing the tops of said compartments and forming upper covering walls for said passage means and air access passages.

6. A tray as claimed in claim 1, wherein the compartments are arranged in longitudinally extending rows with the compartments of spaced pairs of adjacent rows in lateral paired communication through said passage means and with the said apertures disposed between adjacent rows of compartments of each said pair of rows.

7. A tray as claimed in claim 6, wherein each passage means includes a pair of shallow crawl passages communicating with a deeper longitudinally extending egg receiving recess between each compartment in the pairs of longitudinally extending rows.

8. A tray as claimed in claim 7, wherein the air access passages comprise separate channels for each of four adjacent compartments in the adjacent rows.

9. A tray as claimed in claim 8, wherein there is provided an imperforate plastic cover sheet sealing to the tray surface portion and forming the upper closing wall for the compartments, recesses, crawl passages and channels.

10. A tray as claimed in claim 9, the longitudinal edge portions of the tray surface portion are provided with inwardly extending air access passages beneath said cover sheet and communicating with each of the compartments in the longitudinal edge rows thereof.

* * * * *